Patented July 16, 1929.

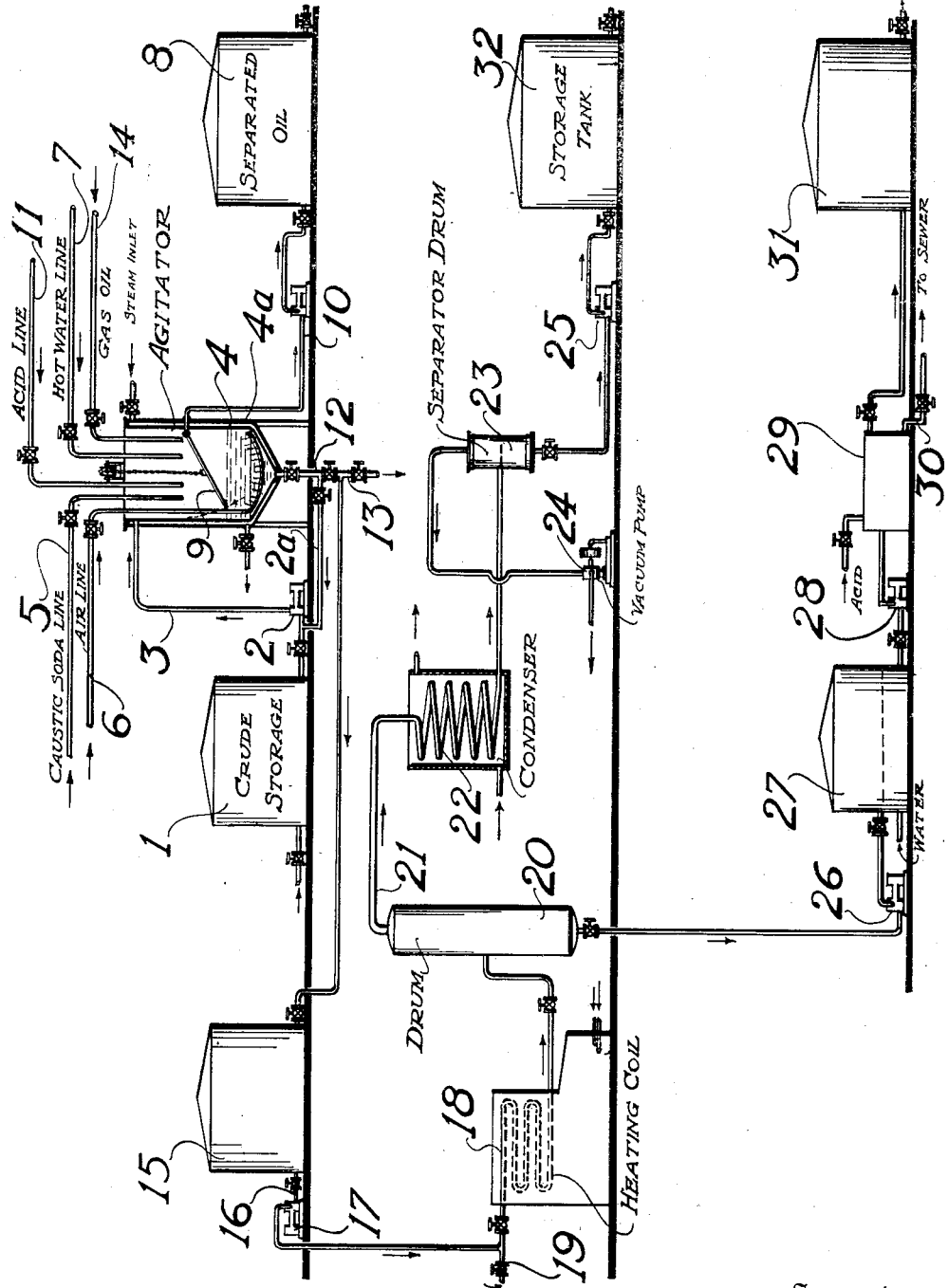

1,720,821

UNITED STATES PATENT OFFICE.

STEWART P. COLEMAN, OF HOUSTON, TEXAS, ASSIGNOR TO STANDARD OIL DEVELOPMENT COMPANY, A CORPORATION OF DELAWARE.

EXTRACTION AND PURIFICATION OF NAPHTHENIC ACID.

Application filed July 30, 1927. Serial No. 209,434.

The present invention relates to a process for obtaining valuable products from petroleum and its fractions and more specifically comprises a process for separating organic acids, which may be obtained in a substantially pure state, from mineral oils and the like. My invention will be fully understood from the following description and drawing, which illustrates an apparatus suitable for carrying out my process.

The drawing illustrates in semi-diagrammatic form an apparatus suitable for carrying out my process and indicates the course of material through the apparatus.

Certain crude mineral oils, for example, Gulf coast petroleum, contain organic acids such as naphthenic acids and it has been difficult heretofore to obtain these acids in a pure state from the crude oil or any of its fractions, since the acids and the heavy lubricating fractions of the oil boil within the same temperature range. My invention comprises a process by which the organic acids may be obtained in a substantially pure state free from mineral oil.

Referring to the drawing, the reference character 1 designates a suitable storage for crude oil or some fraction of the crude containing organic acids. I prefer to first distill the crude oil and to collect the lubricating oil fractions which contain organic acids. The distillate fractions may be treated with acid or purified by other methods used in the petroleum industry before being stored in tank 1. The crude or distillate oil, as the case may be, is pumped by pump 2 through line 3 into an agitator 4 which may be heated by a steam jacket 4ª. Caustic soda solution is admitted by line 5 and is agitated with the oil by means of the air spray 6 or by pump 2 and circulating line 2ª. Hot water is then added by line 7 to make up about 50% of the oil and after agitation the oily and aqueous layers are allowed to settle. The oily layer, comprising the bulk of the oil, is removed to an oil storage tank 8 by means of swing pipe 9 in the agitator and the line 10. The aqueous layer which contains about 2% of soda salts and an approximately equal quantity of mineral oil is then treated with mineral acid, preferably sulphuric acid, admitted by line 11, causing the organic acids and mineral oil to separate from the aqueous layer, which is withdrawn by lines 12 and 13 to the sewer. Strong aqueous caustic soda, preferably just sufficient to combine with the organic acids, is added to the oily layer to again form soda salts, and the mixture of oil and soda salts is blown dry with warm air by line 5.

The mass in the agitator is preferably heated by a steam jacket 4ª and gas oil is added by line 13 equal to 2 to 5 times the volume of the mixture in the agitator.

The mass in the agitator, which is substantially homogeneous and free from water, is then removed to a tank 15 from which it may be continuously fed by line 16 and pump 17 to a heating coil 18 to which steam may also be added by line 19. The mass is heated rapidly to a temperature in excess of 700° F. and is discharged into a vaporizing drum 20 which is preferably maintained under high vacuum so that substantially all of the oil is vaporized. Vapor is carried away by vapor line 21 to condenser 22 and separator drum 23. A vacuum pump 24 communicates with drum 23 and is preferably capable of producing absolute pressures of 1.5 inches of mercury or less. Oil is withdrawn from the drum 23 by pump 25 to storage (not shown).

The soda salts, which have a very low volatility, are removed from the vaporizing drum 20 in a liquid state by pump 26 and are run directly into water in tank 27 from which the aqueous salt solution, now free from oil, is pumped by pump 28 to tank 29. Mineral acid is added to tank 29 to separate the organic acids from the aqueous solution, which is withdrawn to the sewer by line 30 and the acids are collected in tank 31. The acids are preferably distilled under vacuum, in suitable stills (not shown).

As an example of my process, a mixture of oil and the soda salts of organic acids naturally occurring in Gulf coast crude is obtained according to my method, and after carefully drying by blowing with hot air, as described, the mixture is fluxed with two volumes of a gas oil, boiling substantially between 450 and 650° F. The fluxed mixture is then passed through a pipe coil at a rate of approximately 60 gallons per hour per sq. in. of coil cross section. The mass is rapidly heated to a temperature of 950° F. and is flashed into an insulated drum maintained at 1.5 inches of mercury absolute pressure. The naphthenic acids are recovered from the bottoms as described above, and a product is obtained substantially free from oil. The neutralization value of the vacuum distilled acids is at least 170 mg. KOH per gram.

While my process has been described particularly in relation to naphthenic acids found in crude oils, it is applicable to the separation of all acids, whether naturally occurring or formed by chemical reaction, for example by oxidation. The heating of the oil-soap mass should be very rapid so as to avoid decomposition in so far as is possible. The product obtained on redistilling the recovered acids from Gulf coast crude is light yellow in color with little or no odor.

My process is not to be limited by any theory or by any example given by way of illustration. I wish to be limited only by the following claims, in which I wish to claim all novelty inherent in my invention.

I claim:

1. The process for obtaining high boiling organic acids from their mixtures with high boiling oils, comprising separating the acids from the bulk of the oil by converting the acids to salts with alkali, dissolving the salts in water, separating aqueous and oily layers, liberating the acids by addition of mineral acid to the aqueous solution of the salts, withdrawing the liberated acids, reconverting said acids to salts with alkali, distilling under vacuum to remove all traces of oil, withdrawing the unvaporized salts and recovering the acids therefrom.

2. The process for obtaining high boiling organic acids from their mixtures with high boiling oils, which comprises converting the acids to salts with alkali, adding to the mixture an oil boiling below the organic acids, distilling the mixture to remove all trace of oil, and recovering the acids from the unvaporized salts.

3. The process according to claim 10 in which the oil added is a gas oil in proportion of 2 to 5 volumes per volume of mixture.

4. Process for obtaining high boiling organic acids from their mixtures with high boiling hydrocarbon oils, comprising converting the acids to salts with alkali, rapidly heating a continuous stream of the mixture to a temperature in excess of 700° F., the velocity of the stream being increased by the addition of steam, vaporizing the oil, withdrawing the unvaporized salts substantially free of oil, and recovering the acids therefrom.

STEWART P. COLEMAN.